United States Patent Office 2,846,724
Patented Aug. 12, 1958

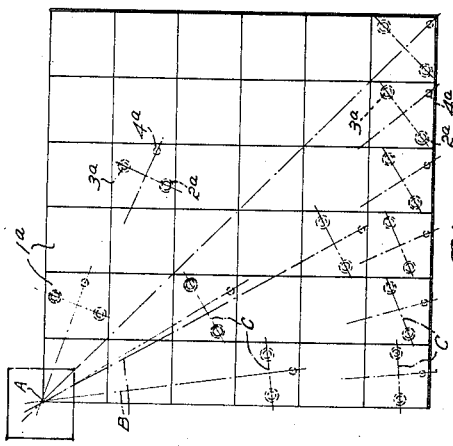

2,846,724

SOLAR REFLECTION DEVICE AND MEANS FOR PRODUCING THE SAME

Thomas C. Aylwin, Ottawa, Ontario, Canada

Application July 13, 1956, Serial No. 597,712

4 Claims. (Cl. 18—34)

This invention relates to a solar reflection device and to a means for producing the same.

The use of solar energy for the operation of stills, furnaces, and other industrial purposes has heretofore been proposed. One drawback to the commercial development of devices involving the use of solar energy has been the absence of an inexpensive, effective, readily available and operable reflecting means for collecting and focussing solar rays. Parabolic mirrors have been suggested for the purpose but they are expensive, fragile, and must be made of such a large size to produce adequate results that they are unwieldly and awkward to handle. Thus, their practical feasibility is open to serious question.

It is an object of this invention to provide a solar reflection device which is inexpensive and easy to manufacture, which is subject to ready manipulation in use, which is highly effective in concentrating solar energy upon a selected area, and which is capable of use in a plurality of individual units for concentration of such energy upon a single selected area.

The invention will be described with reference to the accompanying drawing, in which Figure 1 is a diagram geometrically illustrating a manner of producing a master reflecting surface in accordance with the invention, Figure 2 is a side elevation of a structure for producing such master reflecting surface, Figure 3 is a side elevation of a reflector in accordance with the invention, Figure 4 is a side elevation of a means for mounting such reflector, and Figure 5 is a perspective view of the mounting means shown in Figure 4.

The present invention contemplates the provision of a reflector having a solar reflecting surface composed of a multiplicity of flat, contiguous, differently inclined sections all arranged to reflect solar rays upon a single restricted area.

In the production of such a reflector, it is proposed to provide a master mold surface comprising a plurality of separate flat plates 1 each mounted by means of three posts 2, 3 and 4 upon a base 5. As shown, the plates 1 are square in shape and the group thereof are arranged in a square with their adjacent edges in substantially abutting relation. The upper face 6 of each plate is of mirrorlike or reflective character.

The posts 2, 3 and 4 are located in particular relation to each individual plate 1 in accordance with the diagram shown in Figure 1 wherein the squares 1a represent the plates 1. From the focal point A coinciding with one corner of the group of squares, a line B is drawn through the center point of each square 1a. A line C at right angles to each line B is then drawn through the center point of each square 1a. The small circles 2a and 3a, representative of posts 2 and 3, are located within each square 1a on each line C closely adjacent the edges of the square. The small circle 4a, representative of post 4, is located within each square 1a on each line B closely adjacent the corresponding edge of the square.

Post 4 is adjustable as to height as by means of nuts 7. The upper end of each post 2, 3 and 4 is swivelly connected to the under surface of plate 1 whereby the plate may be swung upon posts 2 and 3 (about an axis coinciding with line C) by adjusting the length of post 4, to vary the inclination of the plate. Posts 2 and 3 may be provided with supporting sleeves 8. Nuts 9 secure the lower ends of posts 2 and 3 to the base.

Assuming that it is desired to focus reflected solar rays upon a single restricted area, indicated at D, each plate 1 is individually inclined by adjusting the height of post 4 (posts 2 and 3 being loosened to provide such adjustment) to accomplish this result. Thereafter, the posts 2, 3 and 4 are tightened in place. The center points of all the reflective surfaces 6 remain in a common plane.

There has thus been produced a composite reflecting surface composed of the differently inclined surfaces 6. This composite surface is now employed as a master mold surface to produce any desired number of reflectors 10 which may be formed of any suitable plastic composition material. Each reflector 10 has a flat bottom surface 11 and a top surface 12 composed of a multiplicity of differently inclined square sections 13 corresponding to the surfaces 6 of the plates 1. It will be apparent that the center points of each square section 13 will be in a common plane parallel to the plane of bottom surface 11. The entire top surface 12 is of mirrorlike or reflective character.

Any suitable means for mounting the reflector 8 for manipulative purposes may be provided. Referring to Figures 4 and 5, a base frame 14 is provided comprising a bottom plate 15 and upstanding marginal ribs 16 and transverse ribs 17. The reflector 10 is adhesively or otherwise secured to the upper edges of ribs 16 and 17, it being important that such edges lie in a common plane for engagement with the planar bottom surface 11 of the reflector 10. A simple method for a layman to assure such planar arrangement of the rib edges is to fill the frame 14 with a level marking liquid and then to grind the edges down to the common level indicated.

The frame 14 with mounted reflector 10 is arranged for tilting and rotative movement about a base 18 by means of a bracket 19 rotatively mounted on the base by means of pin 20 and lugs 21 fixed to frame 14 and pivotally secured to bracket 19.

Each reflecting section 13 is of preferably small size. Thus it may be as small as ¼ inch square and will not normally exceed three inches square. Any convenient number of sections 13 may be employed to make up the composite reflective surface. Thus, it may comprise 36 such sections as shown or it may comprise as many as 144 such sections.

It will be apparent that, in use, a large number of suitably mounted reflectors 10 may be employed to apply heat to a single restricted area D, which may be an appropriate section of a furnace, boiler, still or the like. Thus, the reflectors 8 may be arranged on the circumference of a circle extending around the area D, or they may be arranged in concentric circles about the area D. It will thus be apparent that a much greater concentration of heat derived from the sun is possible as a result of use of a plurality of reflectors in accordance with the invention. Commercially feasible use of solar energy is therefore possible. Moreover, use of reflectors such as described to take advantage of solar energy is readily possible by relatively unskilled persons. Furthermore, reflectors as described may be mass produced at low cost,

I claim:

1. A master mold for solar reflectors comprising a base, a plurality of substantially square plates each having a flat light reflecting upper surface, said plates being arranged in a substantially square group with their adjacent edges in substantially abutting relation, a pair of posts supporting each said plate on said base for tilting movement about the ends thereof, and a third post adjustable as to length carried by the base and engaging each said plate to maintain it in adjusted inclined position, each said third post being located on a straight line extending from a corner of said group through the center point of the plate it engages, each said pair of posts being located on a straight line extending at right angles to said first line.

2. A master mold for solar reflectors comprising a base, a plurality of plates each having a flat light reflecting upper surface, said plates being arranged in a group with their edges in adjacent relation, a pair of posts supporting each said plate on said base for tilting movement about the ends thereof, and a third post adjustable as to length carried by the base and engaging each said plate to maintain it in adjusted inclined position, each said third post being located on a straight line extending from a corner of said group through the center point of the plate it engages, each said pair of posts being located on a straight line extending at right angles to said first line.

3. A master mold for solar reflectors as defined in claim 2, the center points of all said light reflecting surfaces lying in a common plane.

4. A method of producing a solar reflector which comprises arranging a plurality of reflecting surfaces in substantially contiguous relation to each other, tilting each said surface to reflect solar rays to a common point while maintaining the center points of all said surfaces in a common plane, and utilizing the composite surface composed of said plurality of reflecting surfaces as a mold to produce a solar reflector having a top surface complementary to said composite surface, and providing a plane bottom surface on said reflector parallel to the plane of said center points.

References Cited in the file of this patent

UNITED STATES PATENTS

| | | |
|---|---|---|
| 260,657 | Calver | July 4, 1882 |
| 514,669 | Allingham | Feb. 13, 1894 |
| 683,088 | Wideen | Sept. 24, 1901 |
| 797,891 | Himalaya | Aug. 22, 1905 |
| 811,274 | Carter | Jan. 30, 1906 |
| 1,367,472 | Harvey | Feb. 1, 1921 |
| 1,386,781 | Harvey | Aug. 9, 1921 |
| 2,471,954 | Harvey | May 31, 1949 |
| 2,712,772 | Trombe | July 12, 1955 |